US012065558B2

(12) United States Patent
Kim et al.

(10) Patent No.: US 12,065,558 B2
(45) Date of Patent: Aug. 20, 2024

(54) MIXED RECYCLED POLYOLEFIN RESIN COMPOSITION COMPRISING RECYCLED POLYOLEFIN RESIN RECOVERED FROM WASTE SEPARATOR AND RECYCLED PRODUCT USING THE SAME

(71) Applicants: SK INNOVATION CO., LTD., Seoul (KR); SK IE TECHNOLOGY CO., LTD., Seoul (KR)

(72) Inventors: Yun Bong Kim, Daejeon (KR); Jong Sang Park, Daejeon (KR); Kyu Young Cho, Daejeon (KR); Si Uk Cheon, Daejeon (KR)

(73) Assignees: SK INNOVATION CO., LTD., Seoul (KR); SK IE TECHNOLOGY CO., LTD., Seoul (KR)

(*) Notice: Subject to any disclaimer, the term of this patent is extended or adjusted under 35 U.S.C. 154(b) by 0 days.

(21) Appl. No.: 18/194,515

(22) Filed: Mar. 31, 2023

(65) Prior Publication Data
US 2023/0312891 A1 Oct. 5, 2023

(30) Foreign Application Priority Data

Mar. 31, 2022 (KR) .................. 10-2022-0040303
May 13, 2022 (KR) .................. 10-2022-0059228
Mar. 28, 2023 (KR) .................. 10-2023-0040492

(51) Int. Cl.
C08L 23/06 (2006.01)
C08J 11/04 (2006.01)
H01M 10/54 (2006.01)
H01M 50/446 (2021.01)

(52) U.S. Cl.
CPC .............. *C08L 23/06* (2013.01); *C08J 11/04* (2013.01); *H01M 10/54* (2013.01); *H01M 50/446* (2021.01); *C08J 2323/06* (2013.01); *C08L 2205/025* (2013.01); *C08L 2207/20* (2013.01)

(58) Field of Classification Search
CPC ..................................................... C08L 23/06
See application file for complete search history.

(56) References Cited

U.S. PATENT DOCUMENTS

| | | | |
|---|---|---|---|
| 4,138,534 A * | 2/1979 | Tedesco | C08J 11/06 521/143 |
| 2004/0034169 A1* | 2/2004 | Zhou | C08L 23/0815 525/240 |
| 2009/0226813 A1* | 9/2009 | Takita | H01M 50/417 429/129 |
| 2010/0084363 A1* | 4/2010 | Michie, Jr. | H01B 3/441 264/572 |
| 2017/0261131 A1* | 9/2017 | Papillon | C08K 3/26 |

FOREIGN PATENT DOCUMENTS

| | | |
|---|---|---|
| CN | 114006065 A | 2/2022 |
| EP | 4215580 A1 | 7/2023 |
| KR | 102323858 B1 | 11/2021 |

OTHER PUBLICATIONS

KR102181876 translation (Year: 2020).*
KR102181876 original (Year: 2020).*
KR101490814 original (Year: 2015).*
KR101490814 translation (Year: 2015).*
CN111403838 original (Year: 2020).*
CN111403838 translation (Year: 2020).*
Extended European Search Report for European Patent Application No. 23165765.1, mailed Feb. 19, 2024 (10 pages).
USPTO Non-Final Office Action for U.S. Appl. No. 18/193,408, mailed Dec. 7, 2023 (16 pages).

* cited by examiner

*Primary Examiner* — Irina Krylova
(74) *Attorney, Agent, or Firm* — Perkins Coie LLP

(57) ABSTRACT

The disclosed technology relates to a mixed recycled polyolefin resin composition comprising a recycled polyolefin resin obtained from a waste separator and a new polyolefin resin, and a recycled product using the same. The mixed recycled polyolefin resin composition comprising a new polyolefin resin and a recycled polyolefin resin from a waste separator based on an embodiment of the disclosed technology has excellent physical and chemical properties.

8 Claims, No Drawings

MIXED RECYCLED POLYOLEFIN RESIN COMPOSITION COMPRISING RECYCLED POLYOLEFIN RESIN RECOVERED FROM WASTE SEPARATOR AND RECYCLED PRODUCT USING THE SAME

CROSS-REFERENCE TO RELATED APPLICATIONS

This patent document claims the priority and benefits of Korean Patent Application No. 10-2022-0040303, filed on Mar. 31, 2022, and Korean Patent Application No. 10-2022-0059228, filed on May 13, 2022, and Korean Patent Application No. 10-2023-0040492, filed on Mar. 28, 2023. The entire contents of each of the above-referenced applications are incorporated by reference in this document in their entirety.

TECHNICAL FIELD

The disclosed technology relates to a mixed recycled polyolefin resin composition comprising a recycled polyolefin resin recovered from a waste separator and a recycled product using the same.

BACKGROUND

Secondary batteries such as lithium secondary batteries may be recharged and reused, unlike primary batteries that are used once and thrown away. A secondary battery may include a cathode, an anode, an electrolyte, and a separator. Materials extracted from those components of a secondary battery can be recycled and used for many purposes.

SUMMARY

The disclosed technology can be implemented in some embodiments to provide a mixed recycled polyolefin resin composition comprising a recycled polyolefin resin recovered from a waste separator and a new polyolefin resin, and a recycled product using the same. In an embodiment of the disclosed technology, a mixed recycled polyolefin resin composition includes a recycled polyolefin resin that is recovered from a waste separator and ensures excellent physical and chemical properties so as to be used for new battery production. The disclosed mixed recycled polyolefin resin compositions may be used for both making new batteries and recycled products such as cases, films, sheets, shoes, clothing, or plastic products, thus facilitating recycling useful materials from wasted battery components and non-operating batteries to reduce various adverse effects such as air pollution and greenhouse emissions.

In another embodiment of the disclosed technology, a mixed recycled polyolefin resin composition includes a recycled polyolefin resin recovered from a waste separator so as to be used for blow molding.

In one general aspect, there is provided a mixed recycled polyolefin resin composition comprising a new polyolefin resin and a recycled polyolefin resin obtained from a waste separator, wherein the mixed recycled polyolefin composition has an Izod impact strength of 15 kJ/m$^2$ or more as measured according to the ASTM D256 standard for measuring material tensile properties provided by the American Society for Testing of Materials (ASTM). In some implementations, Izod impact strength may indicate the kinetic energy needed to initiate fracture and continue the fracture until the specimen is broken.

A weight of the new polyolefin resin may range from 40% to 90% of a weight of the mixed recycled polyolefin resin composition and a weight of the recycled polyolefin resin from a waste separator may range from 10% to 60% of the weight of the mixed polyolefin recycled resin composition.

At most 5.00% of the mixed recycled polyolefin resin composition may include inorganic particles.

The recycled polyolefin resin from the waste separator may comprise a recycled polyolefin resin obtained by detaching a coating layer from a waste separator that includes an inorganic particle coating layer.

The recycled polyolefin resin from the waste separator may further comprise a recycled polyolefin resin obtained from another waste separator that does not include an inorganic particle coating layer.

The recycled polyolefin resin obtained by detaching the inorganic particle coating layer from the waste separator including the inorganic particle coating layer may be obtained by detaching the inorganic particle coating layer at a coating detachment rate ranging from 90% to 99.9%.

The recycled polyolefin resin from the waste separator may comprise 20 to 600 parts by weight of the recycled polyolefin resin obtained from the waste separator that does not include the inorganic particle coating layer, based on 100 parts by weight of the recycled polyolefin resin obtained by detaching the inorganic particle coating layer from the waste separator including the inorganic particle coating layer.

The mixed recycled polyolefin resin composition may have a melt flow rate ratio ($MI_{21.6}/MI_5$) ranging from 5 to 22 at 190° C.

The mixed recycled polyolefin resin composition may have a tensile strength that is at least 200 kgf/cm$^2$ according to ASTM D638 standard.

The mixed recycled polyolefin resin composition may have a tensile elongation that is at least 250% according to ASTM D638 standard.

The mixed recycled polyolefin resin composition may have a flexural modulus that is at least 9,500 kgf/cm$^2$ according to ASTM D790 standard.

DETAILED DESCRIPTION

Various specific examples of features and associated advantages of the disclosed technology and methods for battery separators in rechargeable batteries are disclosed in the following detailed description of embodiments However, the disclosed technology is not limited to embodiments to be described below, but may be implemented in various different forms based on what is disclosed in this patent document.

In some embodiments, the term "combinations thereof" may mean mixing or copolymerization of constituents.

In some embodiments, the term "separator" may refer to a battery separator between the battery cathode and the battery anode which may include, e.g., in some implementations, a ceramic coated separator (CC S) coated with a coating layer that includes inorganic particles on at least a part of a surface of a polyolefin-based porous separator substrate or a separator whose entire surface is not coated with a coating layer that includes inorganic particles. In implementations, the phrase "at least a portion of the surface is coated with the coating layer" may mean that a portion or the whole of one or both surfaces is coated with the coating layer; and the "coating layer" may include a suitable composition of a separator coating layer, and is not particularly limited in configuration such as that various implementations for the separator coating layer may be used.

In some embodiments, the term "waste separator" may refer to an off-spec separator generated during a separator manufacturing process that does not meets a certain technical specification for the desired separator, or a separator obtained in a recycling or disassembly process after collecting waste batteries or various waste electrochemical devices.

The term "new polyolefin resin" as used herein is a pellet or powder manufactured from polyolefin resin and may refer to a polyolefin resin that has not been processed into other articles.

A secondary battery may include a cathode, an anode, an electrolyte, and a separator. A separator is a film-type substrate with a microporous structure, positioned between the cathode and the anode and having a thickness of 5 to 100 µm, for example, 5 to 30 µm. A separator also serves as an ion-conductive membrane that provides a path for lithium ions to move between the cathode and anode. A separator may increase the stability of a secondary battery by blocking contact between the cathode and anode to electrically isolate the electrodes from each other.

When an internal temperature excessively increases due to an abnormality in a battery, a certain separator may be melted, resulting in an undesirable contact between the electrodes and thereby causing the battery to explode due to a short circuit. In order to address these stability issues, a Ceramic Coated Separator (CCS) that includes an inorganic particle layer formed using inorganic particles on one side or both sides of the separator can be used.

In order to recycle separators, chipping and/or pelletizing may be needed, but chipping and/or pelletizing may be difficult due to an inorganic particle layer on a surface of a ceramic coated separator. When extrusion is performed, there can be a high load in an extruder due to a high viscosity of a resin mixture. In order to address these issues, an additive can be added to improve processability, but in this case, physical properties of a resin composition may be significantly deteriorated.

The disclosed technology can be implemented in some embodiments to provide a mixed recycled polyolefin resin composition comprising a new polyolefin resin and a recycled polyolefin resin recovered from a waste separator.

In an embodiment of the disclosed technology, the mixed recycled polyolefin resin composition may comprise, as a lower limit, 40% by weight or more, 50% by weight or more, or 60% by weight or more and as an upper limit, 90% by weight or less, 80% by weight or less, or 70% by weight or less of the new polyolefin resin, based on the total weight of the composition. The mixed recycled polyolefin resin composition may comprise, for example, 40 to 90% by weight, 50 to 80% by weight, or 60 to 70% by weight of the new polyolefin resin. In addition, the mixed recycled polyolefin resin composition may comprise, as a lower limit, 10% by weight or more, 20% by weight or more, or 30% by weight or more and as an upper limit, 60% by weight or less, 50% by weight or less, or 40% by weight or less of the recycled polyolefin resin recovered from the waste separator, based on the total weight of the composition. For example, the mixed recycled polyolefin resin composition may comprise 10 to 60% by weight, 20 to 50% by weight, or 30 to 40% by weight.

When the mixed recycled polyolefin resin composition satisfies the above range, the composition has excellent mechanical properties such as melt index, impact strength, and elongation. Thus, when manufacturing the recycled product through blow molding, the recycled product has excellent environmental stress crack resistance and durability, flow marks and gelation do not occur, and defects do not occur when attaching the label to the surface of the recycled product.

In an embodiment of the disclosed technology, the new polyolefin-based resin may be, but is not limited to, high density, medium density, low density, linear low density polyethylene, crystalline polypropylene, amorphous polypropylene, or polybutylene.

In an embodiment of the disclosed technology, the new polyolefin resin may have a density of 0.930 kg/m$^3$ or more or 0.950 kg/m$^3$ or more as a lower limit, and 0.990 kg/m$^3$ or less or 0.980 kg/m$^3$ or less as an upper limit. For example, the new polyolefin resin may have a density of 0.930 to 0.990 kg/m$^3$ or 0.950 to 0.980 kg/m$^3$. If the new polyolefin resin satisfies the above range, the composition has excellent mechanical properties and thus it is easy to manufacture a recycled product using the composition, but the disclosed technology is not limited thereto.

In an embodiment of the disclosed technology, the new polyolefin resin may have a weight average molecular weight of 80,000 g/mol or more, 100,000 g/mol or more, or 130,000 g/mol or more as a lower limit, and may have, without limitation, 500,000 g/mol less, 300,000 g/mol or less, or 170,000 g/mol or less as an upper limit. For example, the new polyolefin resin may have a weight average molecular weight of 80,000 to 500,000 g/mol, 100,000 to 300,000 g/mol, or 130,000 to 170,000 g/mol. When the new polyolefin resin satisfies the above range, the physical properties such as strength of the recycled product may be improved, and the increase in formability and yield may be achieved.

In an embodiment of the disclosed technology, the new polyolefin resin may have a molecular weight distribution (MWD, Mw/Mn) of 5 to 20, 10 to 19, or 13 to 17. Within the above range, the new polyolefin resin has excellent environmental stress crack resistance and is mixed with recycled polyolefin resin recovered from the waste separator to ensure sufficient processability and physical properties, and defects do not easily occur when the product is molded, but the range is not limited as long as the physical properties of the disclosed technology are satisfied.

In an embodiment of the disclosed technology, the new polyolefin resin may have a melt index ($MI_{21.6}$) of 20 g/10 min or more, 50 g/10 min or more, or 70 g/10 min or more as a lower limit, and without limitation, 200 g/10 min or less, 150 g/10 min or less, or 100 g/10 min or less as an upper limit, as measured at 190° C. and under a load of 21.6 kg according to ASTM D1238. The new polyolefin resin may have a melt index ($MI_{21.6}$) of, for example, 20 to 200 g/10 min, 50 to 150 g/10 min, or 70 to 100 g/10 min. In addition, the new polyolefin resin may have a melt index ($MI_5$) of 0.5 g/10 min or more, 2.0 g/10 min or more, or 3.5 g/10 min or more as a lower limit, and 10 g/10 min or less, 7.5 g/10 min or less, or 5.0 g/10 min or less as an upper limit, as measured at 190° C. and under a load of 5 kg according to the standard of ASTM D1238 for measuring material tensile properties provided by the American Society for Testing of Materials (ASTM). When the new polyolefin resin satisfies the above range, the new polyolefin resin has excellent flowability, easy processing and foaming, and excellent mechanical properties such as tensile strength.

In general, a polyolefin-based elastomer is added to reinforce physical properties and improve inorganic content of the new polyolefin resin. So, the polyolefin-based elastomer is expensive and thus the overall process cost increases, and the density of some new polyolefin resins is lowered by the addition of the polyolefin-based elastomer, thereby degrading heat resistance and rigid properties. However, when a new polyolefin resin that satisfies the above physical properties is used, there is an advantage in that the object of the disclosed technology may be achieved without adding the polyolefin-based elastomer.

In an embodiment of the disclosed technology, the recycled polyolefin resin recovered from the waste separator is mixed with the new polyolefin resin in the above composition ratios, and may have a melt flow rate ratio (MFRR) of 5 or more, 8 or more, 10 or more, 12 or more, or 15 or more as a lower limit, and 22 or less, 20 or less, or 19 or less as an upper limit. The recycled polyolefin resin may have a melt flow rate ratio of, for example, 5 to 22, 8 to 20, 10 to 19, 12 to 19, or 15 to 19. When the recycled polyolefin resin adjusted within the above range is used, it may provide a mixed recycled polyolefin resin composition that may manufacture an article exhibiting desired physical properties in the disclosed technology while satisfying excellent processability.

In some implementations, the melt flow rate ratio is a value obtained by dividing the melt index ($MI_{21.6}$) measured at 190° C. and under a load of 21.6 kg by the melt index ($MI_5$) measured at 190° C. and a load of 5 kg according to ASTM D1238.

When a recycled polyolefin resin recovered from a waste separator that satisfies the above range is used, an Izod impact strength is 15 kJ/m$^2$ or more, and the effect of 300%, for example 400% or more, which is intended to be achieved in the disclosed technology, is significantly well achieved even in tensile elongation. However, when the desired physical properties in the disclosed technology are better satisfied, it is not necessarily limited thereto.

In an embodiment of the disclosed technology, the recycled polyolefin resin recovered from the waste separator may have a weight average molecular weight of 100,000 to 1,000,000 g/mol or 300,000 to 500,000 g/mol, and a molecular weight distribution (MWD, Mw/Mn) of 6 to 20 or 8 to 15, but is not particularly limited as long as it has the above melt flow rate ratio when mixed with the new polyolefin resin.

In an embodiment of the disclosed technology, the mixed recycled polyolefin resin composition may comprise the inorganic particle in an amount of 5.00% by weight or less, 3.00% by weight or less, 1.00% by weight or less, or 0.30% by weight or less as an upper limit, and without particular limitation, 0.01% by weight or more, 0.05% by weight or more, or 0.10% by weight or more as a lower limit, based on the total weight of the composition. the mixed recycled polyolefin resin composition may comprise, for example, 0.01 to 5.00% by weight, 0.05 to 3.00% by weight, 0.05 to 1.00% by weight, or 0.10 to 0.30% by weight of the inorganic particle. When the mixed recycled polyolefin resin composition satisfies the above range, the desired physical properties in the disclosed technology may be better satisfied, which seems to obtain more excellent physical properties due to a complementary synergistic effect between the inorganic particles and the matrix resin when the trace amount of the inorganic material is present, but it is not clear.

In an embodiment of the disclosed technology, any type of inorganic particles may be used as the inorganic particles. However, non-limiting examples of the inorganic particles include alumina, aluminum hydroxide, silica, barium oxide, titanium oxide, magnesium oxide, magnesium hydroxide, clay, glass powder, boehmite, pseudo-boehmite, or a mixture thereof. The pseudo-boehmite is represented by Formula AlO(OH), and refers to a material having a microcrystalline boehmite-like structure with a high water content.

In an embodiment of the disclosed technology, the recycled polyolefin resin recovered from the waste separator may comprise a recycled polyolefin resin recovered from a waste separator without an inorganic particle coating layer, a recycled polyolefin resin recovered by detaching an inorganic particle coating layer from a waste separator including an inorganic particle coating layer, or combinations thereof. In this case, the recycled polyolefin resin recovered by detaching the inorganic particle coating layer from the waste separator including the inorganic particle coating layer may be recovered from the waste separator substrate from which the inorganic particle coating layer is removed.

The component of the waste separator substrate may be at least one selected from the group consisting of high-density polyethylene, low-density polyethylene, linear low-density polyethylene, ultra-high molecular weight polyethylene, and polypropylene.

In an embodiment of the disclosed technology, the detachment may be performed by immersing a waste separator having an inorganic particle coating layer in a bath and then performing surface polishing.

In an embodiment of the disclosed technology, an immersion time required to sufficiently wet the waste separator may be 10 seconds to 5 minutes. If the immersion time is too short, the waste separator may not be wet enough and the coating layer may not be detached. Conversely, if the immersion time is too long, process efficiency may decrease. In consideration of the above-described viewpoint, the immersion time may be 10 seconds to 3 minutes, or 10 seconds to 2 minutes, or 30 seconds to 5 minutes, or 30 seconds to 3 minutes, or 30 seconds to 2 minutes. The immersion time during which the waste separator is immersed may be used to indicate a residence time of the waste separator in the bath to be immersed in the bath into which the waste separator is immersed is configured separately, and a residence time of the waste separator in the bath until the surface polishing treatment is performed if the immersion treatment and the surface polishing treatment are performed in the same bath.

After the waste separator is immersed in the bath, surface polishing may be performed on the waste separator In an embodiment of the disclosed technology. The surface polishing treatment is sufficient as long as the inorganic particles coated on the surface of the waste separator may be detached by rubbing the surface using various devices or instruments, and the surface polishing treatment means is not particularly limited. Non-limiting examples of the surface polishing treatment means include various devices or instrument including one or more of (a) a substrate having a woven fabric, a non-woven fabric, a calendered non-woven fabric, a polymer film, a stitchbonded fabric, an open cell foam, or a close cell foam on its surface; and (b) a brush having an organic polymer fiber or an inorganic fiber as a brush bristle.

As the organic polymer fiber, any fiber made of an organic polymer material utilizing a brush may be used. Non-limiting examples of the organic polymer fibers may include one or a mixture of two or more of ester-based fibers, nylon-based fibers, cellulose-based fibers, acryl-based fibers, olefin-based fibers, natural fibers, and polyvinyl chloride-based fibers.

As the inorganic fiber, any inorganic fibers utilizing brushes may be used. Non-limiting examples of the inorganic fiber may include one or a mixture of two or more of silicon carbide-based fibers, carbon fibers, metal oxide fibers, metal nitride fibers, and metal carbonitride fibers.

In some implementations, if the surface polishing treatment of the waste separator is performed using a surface polishing treatment means having excessive hardness, the waste separator may be torn, and inorganic particles may be incorporated into a torn space of the waste separator. In consideration of this, it is necessary to appropriately adjust the hardness of the surface polishing treatment means. Although not particularly limited, in the brush among the surface polishing treatment means, the brush bristle may have an R-scale Rockwell hardness of 80 to 140 or 90 to 130 as measured according to ASTM D 786.

In an embodiment of the disclosed technology, the surface polishing treatment may include a scrubbing process for a surface of the waste separator using one or two or more rolls provided on at least a part of the surface of one or more of the (a) substrate and (b) brush.

According to the disclosed technology, the surface polishing treatment may be performed on the waste separator to detach the coating layer coated on the surface. However, in an embodiment of the disclosed technology, the process of detaching the coating layer coated on the surface of the waste separator may further include ultrasonic treatment.

In an embodiment of the disclosed technology, the ultrasonic treatment may be performed before, simultaneously, or after the surface polishing treatment, and the time point at which the ultrasonic treatment is performed is not particularly limited. According to the disclosed technology, by performing ultrasonic treatment in the bath, ultrasonic vibration and rotation may be applied to water molecules in the bath interposed between the apparatus for performing the ultrasonic treatment and the waste separator to be treated, and the surface of the waste separator may be ultra-finely processed by the vibration and rotation of the water molecules. The ultra-fine processing may lower a bonding strength between the waste separator and the coating layer.

In an embodiment of the disclosed technology, after performing the ultrasonic treatment, the surface polishing treatment may be performed. According to the disclosed technology, if ultrasonic treatment is first performed as a pretreatment, the bonding strength between the waste separator and the coating layer may be lowered, which may allow the coating layer to be better detached from the waste separator during surface polishing as a post-treatment.

The instrument for performing the ultrasonic treatment is not particularly limited, but non-limiting examples thereof may include an ultrasonic polishing device including an ultrasonic oscillator, a vibrator, and a horn.

In an embodiment of the disclosed technology, the ultrasonic treatment may be performed under conditions of a frequency of 10 to 50 kHz, or 10 to 40 kHz, or 10 to 30 kHz.

In an embodiment of the disclosed technology, the ultrasonic treatment may be performed under conditions of an output of 300 to 1500 W or 300 to 1200 W or 300 to 1000 W or 500 to 1500 W or 500 to 1200 W, or 500 to 1000 W.

In an embodiment of the disclosed technology, the ultrasonic treatment time may be 10 seconds to 5 minutes. If the ultrasonic treatment time is too short, there is a concern that the bonding strength between the waste separator and the coating layer may not be sufficiently lowered. Conversely, if the ultrasonic treatment time is too long, the effect of lowering the bonding strength between the waste separator and the coating layer may be saturated, and the process efficiency may be degraded. In consideration of the above-described viewpoint, in an embodiment of the disclosed technology, the ultrasonic treatment time may be 10 seconds to 3 minutes or 10 seconds to 2 minutes or 30 seconds to 5 minutes or 30 seconds to 3 minutes, or 30 seconds to 2 minutes.

In an embodiment of the disclosed technology, the content of the inorganic particles included in the inorganic particle coating layer may be 10% by weight or more, 20% by weight or more, or 30% by weight or more as a lower limit, and 90% by weight or less, 80% by weight or less, or 75% by weight or less as an upper limit, based on the total weight of the coating layer. The content of the inorganic particles may be, but is not limited to, for example, 10 to 90% by weight, 20 to 80% by weight, or 30 to 75% by weight.

Through the detachment, all or part of the inorganic particle coating layer of the waste separator having the inorganic particle coating layer may be detached. Specifically, the inorganic particle coating layer may have a "coating detachment rate (%)" calculated by the following Equation of 90% or more, 95% or more, or 98% or more, and may have, without limitation, 99.9% or less. When the coating layer satisfies the above range, it is easy to recycle the waste separator, and the recycled resin composition may comprise an amount of inorganic particles capable of achieving the desired physical properties, but the disclosed technology is not limited thereto.

Coating detachment rate (%)=(initial weight of separator−final weight of separator)/(weight of coating layer before detachment)*100

Here, the "initial weight of separator" is a weight of the separator before performing a coating layer detachment process, and the "final weight of separator" is a weight of the separator after performing a coating layer detachment process. The "weight of coating layer before detachment" is a weight obtained by subtracting the weight of the separator before coating from the initial weight of the separator.

When the inorganic particle coating layer is detached from the separator having the inorganic particle coating layer, the inorganic particles are removed so that the content of the inorganic particles may be 5.00% by weight or less, 3.00% by weight or less, 1.00% by weight or less, or 0.30% by weight or less as an upper limit, and without particular limitation, 0.01% by weight or more, 0.05% by weight or more, or 0.10% by weight or more as a lower limit.

After detaching the coating layer from the waste separator including the inorganic particle coating layer by using the above process, a process of washing the waste separator from which the coating layer is detached may be performed. The washing process may be performed using distilled water.

A process of drying the washed waste separator may then be performed. In an embodiment, the drying temperature may be 50 to 150° C., 50 to 120° C., or 50 to 100° C. The drying time is not particularly limited, but in an embodiment, it may be 30 minutes to 6 hours, 30 minutes to 3 hours, or 30 minutes to 2 hours.

After the coating layer detachment process, the recycled polyolefin resin may be recovered by detaching the inorganic particle coating layer from the separator having the inorganic particle coating layer through a process of washing and drying the waste separator from which the coating layer is detached.

In an embodiment of the disclosed technology, the recycled polyolefin resin recovered from the waste separator may comprise a recycled polyolefin resin recovered by detaching the coating layer from the waste separator including the inorganic particle coating layer.

In an embodiment of the disclosed technology, the mixed recycled polyolefin resin composition may comprise, as a lower limit, 1% by weight or more, 5% by weight or more, or 10% by weight or more and, as an upper limit, without limitation, 50% by weight or less, 30% by weight or less, or 20% by weight or less of the recycled polyolefin resin recovered by detaching the coating layer from the waste separator including the inorganic particle coating layer, based on the total weight of the mixed recycled polyolefin resin composition. The mixed recycled polyolefin resin composition may comprise, for example, 1 to 50% by weight, 5 to 30% by weight, or 10 to 20% by weight of the recycled polyolefin resin.

In addition, in an embodiment of the disclosed technology, the recycled polyolefin resin recovered from the waste separator may further comprise a recycled polyolefin resin recovered from the waste separator that does not include an inorganic particle coating layer.

In an embodiment of the disclosed technology, the recycled polyolefin resin recovered from the waste separator may comprise, as a lower limit, 20 parts by weight or more, 50 parts by weight or more, or 100 parts by weight or more and, as an upper limit, 600 parts by weight or less, 300 parts by weight or less, or 200 parts by weight or less of the recycled polyolefin resin recovered from the waste separator that does not include the inorganic particle coating layer, based on 100 parts by weight of the recycled polyolefin resin recovered by detaching the inorganic particle coating layer from the waste separator including the inorganic particle coating layer. The recycled polyolefin resin may include, for example, 20 to 600 parts by weight, 50 to 300 parts by weight, or 100 to 200 parts by weight of the recycled polyolefin resin. However, as long as the mixed recycled polyolefin resin composition according to the disclosed technology may satisfy the physical properties to be achieved, the range is not limited thereto.

In an embodiment of the disclosed technology, the mixed recycled polyolefin resin composition may be prepared by introducing the new polyolefin resin and the recycled polyolefin resin recovered from the waste separator into a single-screw extruder or a twin-screw extruder, and then melt blending the resulting mixture at a temperature of 170 to 250° C., 180 to 230° C., or 190 to 220° C.

In an embodiment of the disclosed technology, the mixed recycled polyolefin resin composition may exhibit a resistance to impact measured by an Izod impact strength of 15 kJ/m$^2$ or more, 18 kJ/m$^2$ or more, 20 kJ/m$^2$ or more, 22 kJ/m$^2$ or more, 24 kJ/m$^2$, or 25 kJ/m$^2$ or more as a lower limit, and without particular limitation, 35 kJ/m$^2$ or less or 30 kJ/m$^2$ or less as an upper limit as measured at room temperature (23° C.) in accordance with ASTM D256. The mixed recycled polyolefin resin composition may have an Izod impact strength of, for example, 15 to 35 kJ/m$^2$, 20 to 30 kJ/m$^2$, 24 to 30 kJ/m$^2$, or 25 to 30 kJ/m$^2$. When the composition satisfies the above range, a product using the composition has excellent impact resistance, chemical resistance, processability, and heat resistance.

In an embodiment of the disclosed technology, the mixed recycled polyolefin resin composition may have a density of 0.940 kg/m$^3$ or more or 0.955 kg/m$^3$ or more as a lower limit, and 0.990 kg/m$^3$ or less or 0.975 kg/m$^3$ or less as an upper limit, as measured according to ASTM D792. The mixed recycled polyolefin resin composition may have a density of, for example, 0.940 to 0.990 kg/m$^3$ or 0.955 to 0.975 kg/m$^3$.

In an embodiment of the disclosed technology, the mixed recycled polyolefin resin composition may simultaneously satisfy the physical properties of a tensile strength of 200 kgf/cm$^2$ or more, 230 kgf/cm$^2$ or more, or 270 kgf/cm$^2$ or more as a lower limit, and without particular limitation, 500 kgf/cm$^2$ or less as an upper limit as measured in accordance with ASTM D638. In addition, a tensile elongation of 250% or more, 300% or more, or 400% or more as a lower limit, and without particular limitation, 500% or less as an upper limit as measured according to ASTM D638. When the mixed recycled polyolefin resin composition simultaneously satisfies the ranges of tensile strength and tensile elongation, tearing or bending does not occur when using a recycled product made of the mixed recycled polyolefin resin composition, such that the recycled product may maintain continuous performance, but the two physical properties need not be satisfied at the same time.

In an embodiment of the disclosed technology, the mixed recycled polyolefin resin composition may have a flexural modulus of 9,500 kgf/cm$^2$ or more, in an example, 9,700 kgf/cm$^2$ or more, and in another example, 9,900 kgf/cm$^2$ or more as a lower limit, and without particular limitation, 15,000 kgf/cm$^2$ or less as an upper limit as measured in accordance with ASTM D790. The mixed recycled polyolefin resin composition satisfies the above range, the impact resistance, chemical resistance, processability and heat resistance of the product using the same are excellent.

In an embodiment of the disclosed technology, the mixed recycled polyolefin resin composition may be used to manufacture a recycled product through blow molding.

The blow molding may be performed under a condition that a temperature in a pot is 150 to 250° C., 160 to 230° C., or 170 to 220° C.

The disclosed mixed recycled polyolefin resin compositions may be used for both making new batteries and recycled products other than new batteries. Non-limiting examples of the recycled product include articles such as cases, films, sheets, shoes, clothing such as clothes, or plastic products in various industrial fields.

The recycled product may have a thickness of 0.5 to 5 mm, 1 to 4 mm, or 2 to 3 mm.

Hereinafter, examples and comparative examples of the disclosed technology will be described. However, the disclosed technology is not limited to the following examples.

[Measurement Method of Physical Properties]

After injecting the mixed recycled polyolefin resin composition prepared in Examples and Comparative Examples into an injection molding machine (WIZ170E, LS), injection molding was performed at 200° C., and then the injected product was crystallized at room temperature to form a specimen. Here, the size of the specimen was manufactured according to the standards of each measurement item below.

(1) Density (kg/m$^3$)

It was measured according to the ASTM D1505 standard.

(2) Izod impact strength evaluation

According to an ASTM D256 method, a notched Izod impact strength was measured at room temperature (23° C.) after notching a specimen having a thickness of ⅛ inch.

(3) Melt flow rate ratio evaluation

According to ASTM D1238, the melt flow rate ratio was calculated by dividing a melt index ($MI_{21.6}$) measured at 190° C. and under a load of 21.6 kg by a melt index ($MI_5$) measured at 190° C. and under a load of 5 kg.

(4) Tensile strength and tensile elongation evaluation

According to ASTM D638, it was measured at room temperature at a test speed of 50 mm/min.

(5) Flexural modulus evaluation

According to ASTM D790, the flexural strength of a specimen having a thickness of 3.2 mm was measured at a speed of 2.8 mm/min.

EXAMPLE 1

First, a new polyethylene resin having a density of 0.965 g/cm³, a weight average molecular weight of 150,000 g/mol, a molecular weight distribution of 15.4, an $MI_{216}$ of about 82.29 dg/min, and an $MI_5$ of 4.02 dg/min was prepared.

Then, a waste separator (ceramic coated separator, CCS) coated with an inorganic particle coating layer that includes about 94% by weight of inorganic particles based on the total weight of the coating layer was immersed in a bath for 60 seconds, the entire surface of the waste separator was rubbed clockwise twice with a scrubbing cloth (a polyester wiper WW-3012 by KM) to perform 'surface polishing treatment'. Thereafter, ultrasonication was performed for 60 seconds using a sonication horn under conditions of 20 kHz and 750 W in the bath to detach the inorganic particle coating layer and recover the recycled polyolefin resin. Here, the inorganic particle coating layer was detached at a coating detachment rate of about 98.6%, and the recovered polyolefin resin contained boehmite having an average particle diameter of 0.7 μm, which is an inorganic particle, at 1% by weight of the resin.

Next, the recycled polyolefin resin was recovered from defective scrap generated in a manufacturing process of a polyolefin microporous membrane that does not include the inorganic particle coating layer.

Then, based on the total weight of the composition, 70% by weight of the new polyethylene resin, 10% by weight of a recycled polyolefin resin, 10% by weight of a recycled polyolefin resin recovered by detaching the inorganic particle coating layer from the waste separator including the inorganic particle coating layer; and 20% by weight of a recycled polyolefin resin (Recycled Lithium-ion Battery Separator, r-LiBS) recovered from the waste separator that does not include the inorganic particle coating layer were introduced into a twin screw extruder and then melt blended at 200° C. to prepare a mixed recycled polyolefin resin composition. The composition and the contents of inorganic particles are shown in Table 1 below. In addition, the mechanical properties of the composition measured according to the physical property measurement method are shown in Table 2.

EXAMPLE 2

A mixed recycled polyolefin resin composition was prepared under the same conditions in Example 1 except that 60% by weight of the new polyethylene resin, 20% by weight of the recycled polyolefin resin recovered by detaching the inorganic particle coating layer from the waste separator including the inorganic particle coating layer; and 20% by weight of the recycled polyolefin resin recovered from the waste separator that does not include the inorganic particle coating layer was melt blended. The composition and the contents of the inorganic particles are shown in Table 1 below. In addition, the mechanical properties of the composition measured according to the physical property measurement method are shown in Table 2.

EXAMPLE 3

A mixed recycled polyolefin resin composition was prepared under the same conditions in Example 1 except that 70% by weight of the new polyethylene resin and 30% by weight of the recycled polyolefin resin recovered by detaching the inorganic particle coating layer from the waste separator including the inorganic particle coating layer were melt blended. The composition and the contents of the inorganic particles are shown in Table 1 below. In addition, the mechanical properties of the composition measured according to the physical property measurement method are shown in Table 2.

EXAMPLE 4

A mixed recycled polyolefin resin composition was prepared under the same conditions in Example 1 except that 50% by weight of the new polyethylene resin and 50% by weight of the recycled polyolefin resin recovered by detaching the inorganic particle coating layer from the waste separator including the inorganic particle coating layer were melt blended. The composition and the contents of the inorganic particles are shown in Table 1 below. In addition, the mechanical properties of the composition measured according to the physical property measurement method are shown in Table 2.

Comparative Example 1

A mixed recycled polyolefin resin composition was prepared under the same conditions in Example 1 except that 70% by weight of the new polyethylene resin, 10% by weight of the recycled polyolefin resin recovered without detaching the inorganic particle coating layer from the waste separator including the inorganic particle coating layer; and 20% by weight of the recycled polyolefin resin recovered from the waste separator that does not include the inorganic particle coating layer was melt blended. The composition and the content of the inorganic particles are shown in Table 1 below. In addition, the mechanical properties of the composition measured according to the physical property measurement method are shown in Table 2.

Comparative Example 2

A mixed recycled polyolefin resin composition was prepared under the same conditions in Example 1 except that 70% by weight of the new polyethylene resin, 20% by weight of the recycled polyolefin resin recovered without detaching the inorganic particle coating layer from the waste separator including the inorganic particle coating layer; and 10% by weight of the recycled polyolefin resin recovered from the waste separator that does not include the inorganic particle coating layer was melt blended. The composition and the contents of the inorganic particles are shown in Table 1 below. In addition, the mechanical properties of the composition measured according to the physical property measurement method are shown in Table 2.

Comparative Example 3

A mixed recycled polyolefin resin composition was prepared under the same conditions in Example 1 except that 70% by weight of the new polyethylene resin, 25% by weight of the recycled polyolefin resin recovered without detaching the inorganic particle coating layer from the waste separator including the inorganic particle coating layer; and 5% by weight of the recycled polyolefin resin recovered from the waste separator that does not include the inorganic particle coating layer was melt blended. The composition and the contents of the inorganic particles are shown in Table 1 below. In addition, the mechanical properties of the composition measured according to the physical property measurement method are shown in Table 2.

Comparative Example 4

A mixed recycled polyolefin resin composition was prepared under the same conditions in Example 1 except that 70% by weight of the new polyethylene resin and 30% by weight of the recycled polyolefin resin recovered without detaching the inorganic particle coating layer from the waste separator including the inorganic particle coating layer were melt blended. The composition and the contents of the inorganic particles are shown in Table 1 below. In addition, the mechanical properties of the composition measured according to the physical property measurement method are shown in Table 2.

resin recovered by detaching the inorganic particle coating layer, and exhibit excellent molding efficiency when used in the blow molding process due to its good processability. Through this, it was confirmed that the waste separator may be efficiently recycled.

Since a mixed recycled polyolefin resin composition comprising a new polyolefin resin and a recycled polyolefin resin recovered from a waste separator In an embodiment of the disclosed technology has excellent physical and chemical properties and may be used for the development of applications in various industrial fields, thereby having excellent industrial advantages.

The mixed recycled polyolefin resin composition using a recycled polyolefin resin based on the disclosed technology can be implemented in producing a recycled product, including, for example, cases, films, sheets, shoes, clothing such as

TABLE 1

| Division | Unit | Examples | | | | Comparative Examples | | | |
| --- | --- | --- | --- | --- | --- | --- | --- | --- | --- |
| | | 1 | 2 | 3 | 4 | 1 | 2 | 3 | 4 |
| New polyethylene resin | wt % | 70 | 60 | 70 | 50 | 70 | 70 | 70 | 70 |
| CCS (before detachment) | wt % | — | — | — | — | 10 | 20 | 25 | 30 |
| (after detachment) | wt % | 10 | 20 | 30 | 50 | — | — | — | — |
| r-LiBS | wt % | 20 | 20 | — | — | 20 | 10 | 5 | — |
| Inorganic particles | wt % | 0.10 | 0.20 | 0.30 | 0.50 | 7 | 14 | 17.5 | 21 |

TABLE 2

| Division | Examples | | | | Comparative Examples | | | |
| --- | --- | --- | --- | --- | --- | --- | --- | --- |
| | 1 | 2 | 3 | 4 | 1 | 2 | 3 | 4 |
| Density ($kg/m^3$) | 0.96 | 0.96 | 0.97 | 0.97 | 1.00 | 1.04 | 1.09 | 1.15 |
| Izod impact strength ($kJ/m^2$) | 25.5 | 26.4 | 24.3 | 20.5 | 8.1 | 6.2 | 4.5 | 3.5 |
| $MI_5$ (dg/min) | 1.85 | 1.68 | 2.11 | 1.52 | 0.61 | 0.62 | 0.78 | 1.32 |
| $MI_{21.6}$ (dg/min) | 31.67 | 25.36 | 38.85 | 17.84 | 16.19 | 17.69 | 21.66 | 31.19 |
| Melt flow rate ratio ($MI_{21.6}/MI_5$) | 17.11 | 15.10 | 18.41 | 11.74 | 26.54 | 28.53 | 27.70 | 23.60 |
| Tensile strength ($kgf/cm^2$) | 283 | 280 | 278 | 260 | 298 | 289 | 284 | 273 |
| Tensile elongation (%) | 460 | 440 | 420 | 380 | 100 1 | 45 | 18 | 7 |
| Flexural modulus ($kgf/cm^2$) | 10,000 | 10,100 | 10,400 | 10,600 | 11,100 | 11,200 | 12,400 | 14,000 |

It can be seen from Table 2 that the mixed recycled polyolefin resin compositions of Comparative Examples 1 to 4 are not suitable for blow molding because they comprise an excessive amount of inorganic particles and thus has as inferior physical properties of Izod impact strength and tensile elongation, etc., and poor processability due to an excessively high melt flow rate ratio.

However, it can be seen that since Examples 1 to 4, which are mixed recycled polyolefin resin compositions according to the disclosed technology, include recycled polyolefin clothes, or plastic products. The disclosed technology has several environmental advantages such as i) protection of finite resources, ii) reducing pollution and energy consumption in the process of extracting and processing new resources, iii) saving energy needed to produce new resources, iv) reducing the amount of waste and carbon emissions.

As described above, although exemplary embodiments of the disclosed technology have been described, the disclosed technology is not limited thereto, and various changes and modifications may be made to the disclosed exemplary embodiments.

What is claimed is:

1. A mixed recycled polyolefin resin composition comprising:
   a new polyolefin resin and a recycled polyolefin resin from a waste separator that mix with each other,
   wherein the mixed polyolefin resin composition including the new polyolefin resin and the recycled polyolefin resin has an Izod impact strength equal to or higher than 15 kJ/m$^2$ and equal to or lower than 35 kJ/m$^2$ according to ASTM D256 standard,
   wherein at most 1.00% of the mixed recycled polyolefin resin composition includes inorganic particles,
   wherein the recycled polyolefin resin from the waste separator comprises a recycled polyolefin resin obtained by detaching a coating layer from a waste separator that includes an inorganic particle coating layer,
   wherein the recycled polyolefin resin obtained by detaching the inorganic particle coating layer from the waste separator including the inorganic particle coating layer is obtained by detaching the inorganic particle coating layer at a coating detachment rate ranging from 90% to 99.9%,
   wherein the new polyolefin resin has a weight average molecular weight that ranges from 130,000 to 170,000 g/mol and a molecular weight distribution of 13 to 17,
   wherein a weight of the recycled polyolefin resin from the waste separator ranges from 10% to 60% of the weight of the mixed polyolefin recycled resin composition and a weight of the new polyolefin resin may range from 40% to 90% of a weight of the mixed recycled polyolefin resin composition,
   wherein the mixed recycled polyolefin resin composition has a tensile elongation of 300% to 500%.

2. The mixed recycled polyolefin resin composition of claim 1, wherein the recycled polyolefin resin from the waste separator further comprises a recycled polyolefin resin obtained from another waste separator that does not include an inorganic particle coating layer.

3. The mixed recycled polyolefin resin composition of claim 2, wherein the recycled polyolefin resin from the waste separator comprises 20 to 600 parts by weight of the recycled polyolefin resin obtained from the waste separator that does not include the inorganic particle coating layer, based on 100 parts by weight of the recycled polyolefin resin obtained by detaching the inorganic particle coating layer from the waste separator including the inorganic particle coating layer.

4. The mixed recycled polyolefin resin composition of claim 1, wherein the mixed recycled polyolefin resin composition has a melt flow rate ratio ($MI_{21.6}/MI_5$) ranging from 5 to 22 at 190° C.

5. The mixed recycled polyolefin resin composition of claim 1, wherein the mixed recycled polyolefin resin composition has a tensile strength that is at least 200 kgf/cm$^2$ according to ASTM D638 standard.

6. The mixed recycled polyolefin resin composition of claim 1, wherein the mixed recycled polyolefin resin composition has a flexural modulus that is at least 9,500 kgf/cm$^2$ according to ASTM D790 standard.

7. The mixed recycled polyolefin resin composition of claim 1, wherein the recycled polyolefin resin recovered from the waste separator has a weight average molecular weight that ranges from 100,000 g/mol to 1,000,000 g/mol.

8. The mixed recycled polyolefin resin composition of claim 1, wherein the recycled polyolefin resin recovered from the waste separator has a molecular weight distribution (MWD, Mw/Mn) that ranges from 6 to 20.

* * * * *